United States Patent
Provost et al.

(10) Patent No.: US 11,072,344 B2
(45) Date of Patent: Jul. 27, 2021

(54) EXPLOITING ACOUSTIC AND LEXICAL PROPERTIES OF PHONEMES TO RECOGNIZE VALENCE FROM SPEECH

(71) Applicant: The Regents of the University of Michigan, Ann Arbor, MI (US)

(72) Inventors: Emily Mower Provost, Ann Arbor, MI (US); Biqiao Zhang, Ann Arbor, MI (US); Soheil Khorram, Richardson, TX (US)

(73) Assignee: The Regents of the University of Michigan, Ann Arbor, MI (US)

( * ) Notice: Subject to any disclaimer, the term of this patent is extended or adjusted under 35 U.S.C. 154(b) by 288 days.

(21) Appl. No.: 16/356,476

(22) Filed: Mar. 18, 2019

(65) Prior Publication Data

US 2020/0298873 A1    Sep. 24, 2020

(51) Int. Cl.
*G10L 21/00* (2013.01)
*G10L 25/00* (2013.01)
(Continued)

(52) U.S. Cl.
CPC .............. *B60W 50/10* (2013.01); *G05D 1/021* (2013.01); *G10L 15/02* (2013.01); *G10L 15/063* (2013.01);
(Continued)

(58) Field of Classification Search
CPC ......... G10L 25/63; G10L 15/20; G10L 15/22; G10L 15/02; G10L 15/16;
(Continued)

(56) References Cited

U.S. PATENT DOCUMENTS 8,788,270 B2   7/2014   Patel et al.
9,020,822 B2   4/2015   Kalinli-Akbacak
(Continued)

OTHER PUBLICATIONS

Zhang B. "Improving the Generalizability of Speech Emotion Recognition: Methods for Handling Data and Label Variability", 2018, (Doctoral dissertation), pp. 1-161.*
(Continued)

*Primary Examiner* — Olujimi A Adesanya
(74) *Attorney, Agent, or Firm* — Quarles & Brady LLP

(57) ABSTRACT

A method includes receiving acoustic features and phonetic features associated with an utterance from a driver in a vehicle, providing the acoustic features and the phonetic features to a feature fusion sub-network, receiving a feature fusion utterance representation from the feature fusion sub-network, providing one of the acoustic features or the phonetic features to a non-fusion sub-network trained using supervised learning, receiving a non-fusion utterance representation from the non-fusion sub-network, generating an intermediate utterance representation based on the feature fusion utterance representation and the non-fusion utterance representation, providing at least a portion of the intermediate utterance representation to a fully-connected sub-network trained using supervised learning, receiving a valence vector from the fully-connected sub-network, and causing a vehicle control system to perform a vehicle maneuver based on the valence vector.

20 Claims, 3 Drawing Sheets

(51) Int. Cl.
  *G10L 21/06* (2013.01)
  *B60W 50/10* (2012.01)
  *G10L 15/02* (2006.01)
  *G10L 15/06* (2013.01)
  *G05D 1/02* (2020.01)
  *G10L 15/22* (2006.01)
(52) U.S. Cl.
  CPC .......... *G10L 15/22* (2013.01); *B60W 2540/21* (2020.02); *G10L 2015/025* (2013.01)
(58) Field of Classification Search
  CPC G10L 2015/025; G06N 3/006; G06N 3/0454; G06N 3/04; G06N 3/08; B60W 40/08; B60W 2040/089; B60W 2540/21
  See application file for complete search history.

(56) References Cited

U.S. PATENT DOCUMENTS

| | | | |
|---|---|---|---|
| 9,889,856 B1* | 2/2018 | Zhang | G05D 1/0088 |
| 2019/0049957 A1* | 2/2019 | Healey | G06N 3/08 |
| 2019/0073547 A1* | 3/2019 | el Kaliouby | G06K 9/00302 |
| 2019/0332902 A1* | 10/2019 | Gallagher | G06K 9/6293 |
| 2020/0035215 A1* | 1/2020 | Yang | G10L 13/02 |
| 2020/0175970 A1* | 6/2020 | Li | B60W 40/08 |
| 2020/0193347 A1* | 6/2020 | Wang | G06Q 10/06315 |
| 2020/0215294 A1* | 7/2020 | Lee | B60Q 3/745 |

OTHER PUBLICATIONS

Deo et al, "Convolutional social pooling for vehicle trajectory prediction.", Jun. 2018, Proceedings of the IEEE Conference on Computer Vision and Pattern Recognition Workshops. 2018, pp. 1581-1589.*

Huang et al, "A PLLR and multi-stage staircase regression framework for speech-based emotion prediction", Mar. 2017 IEEE International Conference on Acoustics, Speech and Signal Processing (ICASSP) Mar. 5, 2017 (pp. 5145-5149).*

Jin et al, "Speech emotion recognition with acoustic and lexical features", 2015 In 2015 IEEE international conference on acoustics, speech and signal processing (ICASSP) Apr. 1, 2015 (pp. 4749-4753).*

Nicholson et al, "Emotion recognition in speech using neural networks", 2000, Neural computing & applications. Dec. 2000;9(4):290-6.*

Li, "A multi-feature multi-classifier system for speech emotion recognition", May 2018, In 2018 First Asian Conference on Affective Computing and Intelligent Interaction (ACII Asia) May 20, 2018 (pp. 1-6).*

Meshram et al, "An overview and preparation for recognition of emotion from speech signal with multi modal fusion", 2010, In 2010 The 2nd International Conference on Computerand Automation Engineering (ICCAE) Feb. 26, 2010 (vol. 5, pp. 446-452).*

Aldeneh, et al., Pooling Acoustic and Lexical Features for the Prediction of Valence, In Proceedings of the 19th ACM International Conference on Multimodal Interaction, 2017, pp. 68-72.

Aldeneh, et al., Using Regional Saliency for Speech Emotion Recognition, In 2017 IEEE International Conference on Acoustics, Speech and Signal Processing (ICASSP), pp. 2741-2745.

Bitouk, et al., Class-Level Spectral Features for Emotion Recognition, Speech Commun., 2010, 52(7-8):613-625.

Busso, et al., Using Neutral Speech Models for Emotional Speech Analysis, Interspeech 2007, pp. 2225-2228.

Busso, et al., IEMOCAP: Interactive Emotional Dyadic Motion Capture Database, Language Resources and Evaluation, 2008, 42(4):335-363.

Busso, et al., MSP-IMPROV: An Acted Corpus of Dyadic Interactions to Study Emotion Perception, IEEE Transactions on Affective Computing, 2017, 8(1):67-80.

Chang, et al., Learning Representations of Emotional Speech with Deep Convolutional Generative Adversarial Networks, In 2017 IEEE International Conference on Acoustics, Speech and Signal Processing (ICASSP), pp. 2746-2750.

Gamage, et al., Salience Based Lexical Features for Emotion Recognition, In 2017 IEEE International Conference on Acoustics, Speech and Signal Processing (ICASSP), pp. 5830-5834.

Gamage, et al., Modeling Variable Length Phoneme Sequences—A Step Towards Linguistic Information for Speech Emotion Recognition in Wider World, 2017 Seventh International Conference on Affective Computing and Intelligent Interaction (ACII), 6 pages.

Han, et al., Towards Temporal Modelling of Categorical Speech Emotion Recognition, In Interspeech, 2018, pp. 932-936.

Huang et al., An Investigation of Partition-Based and Phonetically-Aware Acoustic Features for Continuous Emotion Prediction from Speech, IEEE Transactions on Affective Computing, 2018, 17 pages.

Hyun, et al., Emotional Feature Extraction Based on Phoneme Information for Speech Emotion Recognition, In RO-MAN 2007—The 16th IEEE International Symposium on Robot and Human Interactive Communication, pp. 802-806.

Kingma, et al., Adam: A method for Stochastic Optimization, ICLR, 2015, 15 pages.

Lee, et al., Emotion Recognition Based on Phoneme Classes, In Eighth International Conference on Spoken Language Processing. 2004, 4 pages.

Neumann, et al., Attentive Convolutional Neural Network Based Speech Emotion Recognition: A Study on the Impact of Input Features, Signal Length, and Acted Speech, arXiv preprint arXiv:1706.00612, 2017, 5 pages.

Povey, et al., The Kaldi Speech Recognition Toolkit, In IEEE 2011 Workshop on Automatic Speech Recognition and Understanding, IEEE Signal Processing Society, 2011, 4 pages.

Rosenberg, Classifying Skewed Data: Importance Weighting to Optimize Average Recall, In Thirteenth Annual Conference of the International Speech Communication Association, 2012, pp. 2242-2245.

Russell, A Circumplex Model of Affect, Journal of Personality and Social Psychology, 1980, 39(6):1161-1178.

Russell, Core Affect and the Psychological Construction of Emotion, Psychological Review, 2003, 110(1):145-172.

Sahay, et al., Multimodal Relational Tensor Network for Sentiment and Emotion Classification, Proceedings of the first Grand Challenge and Workshop on Human Multimodal Language (Challenge—HML), pp. 20-27, Vancouver, Canada, Jul. 15-20, 2018.

Srivastava, et al., Dropout: A Simple Way to Prevent Neural Networks from Overfilling, Journal of Machine Learning Research, 2014, 15(1):1929-1958.

Tzinis, et al., Segment-Based Speech Emotion Recognition Using Recurrent Neural Networks, in 2017 Seventh International Conference on Affective Computing and Intelligent Interaction (ACII), pp. 190-195.

U.S. Department of Transportation, National Highway Traffic Safety Administration, Critical Reasons for Crashes Investigated in the National Motor Vehicle Crash Causation Survey, 2015, 2 pages.

Vlasenko, et al., Vowels Formants Analysis Allows Straightforward Detection of High Arousal Emotions, In 2011 IEEE International Conference on Multimedia and Expo, pp. 1-6.

Vlasenko, et al., Modeling Phonetic Pattern Variability in Favor of the Creation of Robust Emotion Classifiers for Real-Life Applications, Computer Speech and Language, 2014, 28:483-500.

Wollmer, et al., Abandoning Emotion Classes-Towards Continuous Emotion Recognition with Modelling of Long-Range Dependencies, In Proc. 9th Interspeech 2008 incorp. 12th Australasian Int. Conf. on Speech Science and Technology SST 2008, Brisbane, Australia, pp. 597-600.

Yenigalla, et al., Speech Emotion Recognition Using Spectrogram & Phoneme Embedding, In Interspeech, 2018, pp. 3688-3692.

Yoon, et al., Multimodal Speech Emotion Recognition Using Audio and Text, In 2018 IEEE Spoken Language Technology Workshop (SLT), pp. 112-118.

(56) References Cited

OTHER PUBLICATIONS

Zhang, et al., Predicting the Distribution of Emotion Perception: Capturing Inter-Rater Variability, In Proceedings of the 19th ACM International Conference on Multimodal Interaction, pp. 51-59.

* cited by examiner

US 11,072,344 B2

EXPLOITING ACOUSTIC AND LEXICAL PROPERTIES OF PHONEMES TO RECOGNIZE VALENCE FROM SPEECH

STATEMENT REGARDING FEDERALLY SPONSORED RESEARCH

This invention was made with government support under National Science Foundation Grant Number 1651740. The government has certain rights in the invention.

CROSS-REFERENCES TO RELATED APPLICATIONS

Not Applicable.

BACKGROUND OF THE INVENTION

1. Field of the Invention

This invention relates to determining a valence of a speech utterance and performing a driving maneuver in a vehicle based on the determined valence.

2. Description of the Related Art

The National Highway Traffic Safety Administration (NHTSA) has estimated that 94% of vehicle crashes are related to driver behavior, 33% of which result from incorrect decision making (Ref. 26). This is of particular concern within the domain of aggressive driving, defined by the NHTSA as, "driving actions that markedly exceed the norms of safe driving behavior and that directly affect other road users by placing them in unnecessary danger." They go on to note that many of these actions are the result of specific provocation (e.g., frustration with traffic) and together accounted for 56% of fatal crashes from 2003-2007 (Ref. 27). One category of aggressive driving, road rage, is of particular concern. Road rage is defined as "the intent of causing physical harm to another road user" (Ref. 27) and, when coupled with scenarios marked by other emotional events, accounted for approximately 800 fatal crashes between 2004 and 2007 (Ref. 27, estimate based on available data).

Therefore there is a need to identify negative emotions from a driver in order to mitigate negative outcomes during driving.

SUMMARY OF THE INVENTION

The present disclosure provides an improved method of estimating an emotion or valence of human speech.

In one aspect, the present disclosure provides a method in a data processing system that includes at least one processor and at least one memory. The at least one memory includes instructions executed by the at least one processor to implement a valence determination system. The method includes receiving a plurality of acoustic features associated with an utterance from a driver in a vehicle with a vehicle control system, receiving a plurality of phonetic features associated with the utterance, providing the plurality of acoustic features and the plurality of phonetic features to a feature fusion sub-network trained using supervised learning, receiving a feature fusion utterance representation from the feature fusion sub-network, providing one of the plurality of acoustic features or the plurality of phonetic features to a non-fusion sub-network trained using supervised learning, receiving a non-fusion utterance representation from the non-fusion sub-network, generating an intermediate utterance representation based on the feature fusion utterance representation and the non-fusion utterance representation, providing at least a portion of the intermediate utterance representation to a fully-connected sub-network trained using supervised learning, receiving a valence vector from the fully-connected sub-network, and causing the vehicle control system to perform a vehicle maneuver based on the valence vector.

In the method, the feature fusion sub-network may include a convolutional layer and a global pooling layer.

In the method, the fully-connected sub-network may include a plurality of fully-connected layers and a softmax layer. A first fully-connected layer may be configured to output values into the softmax layer.

In the method, the fully-connected sub-network may include a dropout layer configured to output values into a second fully-connected layer.

In the method, the valence vector may include a negative value, a neutral value, and a positive value.

In the method, the phonetic features may be one or more one-hot vectors and the acoustic features may be one or more Mel-frequency Filterbank energy vectors.

In the method, each of the Mel-frequency Filterbank energy filters may have a corresponding one-hot vector.

In the method, the fusion sub-network may include a convolutional layer and a global pooling layer.

In the method, the intermediate utterance representation can be generated by concatenating the feature fusion utterance representation and the non-fusion utterance representation.

In the method, the feature fusion sub-network, the non-fusion sub-network, and the fully-connected sub-network may be trained using supervised learning with a learning rate no greater than 0.0001 and unweighted average recall as a performance measure, and the supervised learning may be run at least twice using a plurality of different layer sizes and in the feature fusion sub-network, the non-fusion sub-network, and the fully-connected sub-network. The at least two different layer sizes may include 128 and 256.

In the method, the driving control system may be associated with a fully autonomous vehicle system.

The method may further include receiving the utterance from an audio sensor coupled to the vehicle and in communication with the processor. The method may further include extracting the acoustic features and the phonetic features from the utterance; and aligning the phonetic features with the acoustic features.

In another aspect, the present disclosure provides a driving control system for a vehicle. The driving control system includes an audio sensor coupled to a vehicle and a controller coupled to the vehicle and in electrical communication with the audio sensor, the controller being configured to execute a program stored in the controller to receive a plurality of acoustic features associated with an utterance from a driver in a vehicle with a vehicle control system, receive a plurality of phonetic features associated with the utterance, provide the plurality of acoustic features and the plurality of phonetic features to a feature fusion sub-network trained using supervised learning, receive a feature fusion utterance representation from the feature fusion sub-network, provide one of the plurality of acoustic features or the plurality of phonetic features to a non-fusion sub-network trained using supervised learning, receive a non-fusion utterance representation from the non-fusion sub-network, generate an intermediate utterance representation based on the feature fusion utterance representation and the non-fusion utterance representation, provide at least a portion of the intermediate utterance representation to a fully-connected sub-network trained using supervised learning; receive a valence vector from the fully-connected sub-network, and cause the vehicle control system to perform a vehicle maneuver based on the valence vector.

In the method, the feature fusion sub-network, the non-fusion sub-network, and the fully-connected sub-network may be trained using supervised learning with a learning rate no greater than 0.0001 and unweighted average recall as a performance measure, and the supervised learning may be run at least twice using a plurality of different layer sizes and in the feature fusion sub-network, the non-fusion sub-network, and the fully-connected sub-network.

In the method, the phonetic features may be one or more one-hot vectors and the acoustic features may be one or more Mel-frequency Filterbank energy vectors.

In the method, the fully-connected sub-network may include a plurality of fully-connected layers and a softmax layer, and a first fully-connected layer may be configured to output values into the softmax layer. The fully-connected sub-network may further include a dropout layer configured to output values into a second fully-connected layer.

In the method, the feature fusion sub-network may include a convolutional layer and a global pooling layer.

These and other features, aspects, and advantages of the present invention will become better understood upon consideration of the following detailed description, drawings and appended claims.

BRIEF DESCRIPTION OF THE DRAWINGS

FIG. 1A shows components of various branches of the emotion recognition models of the disclosure, while FIG. 1B shows architectures of various models of the disclosure.

DETAILED DESCRIPTION OF THE INVENTION

Figures 1A, 1B:
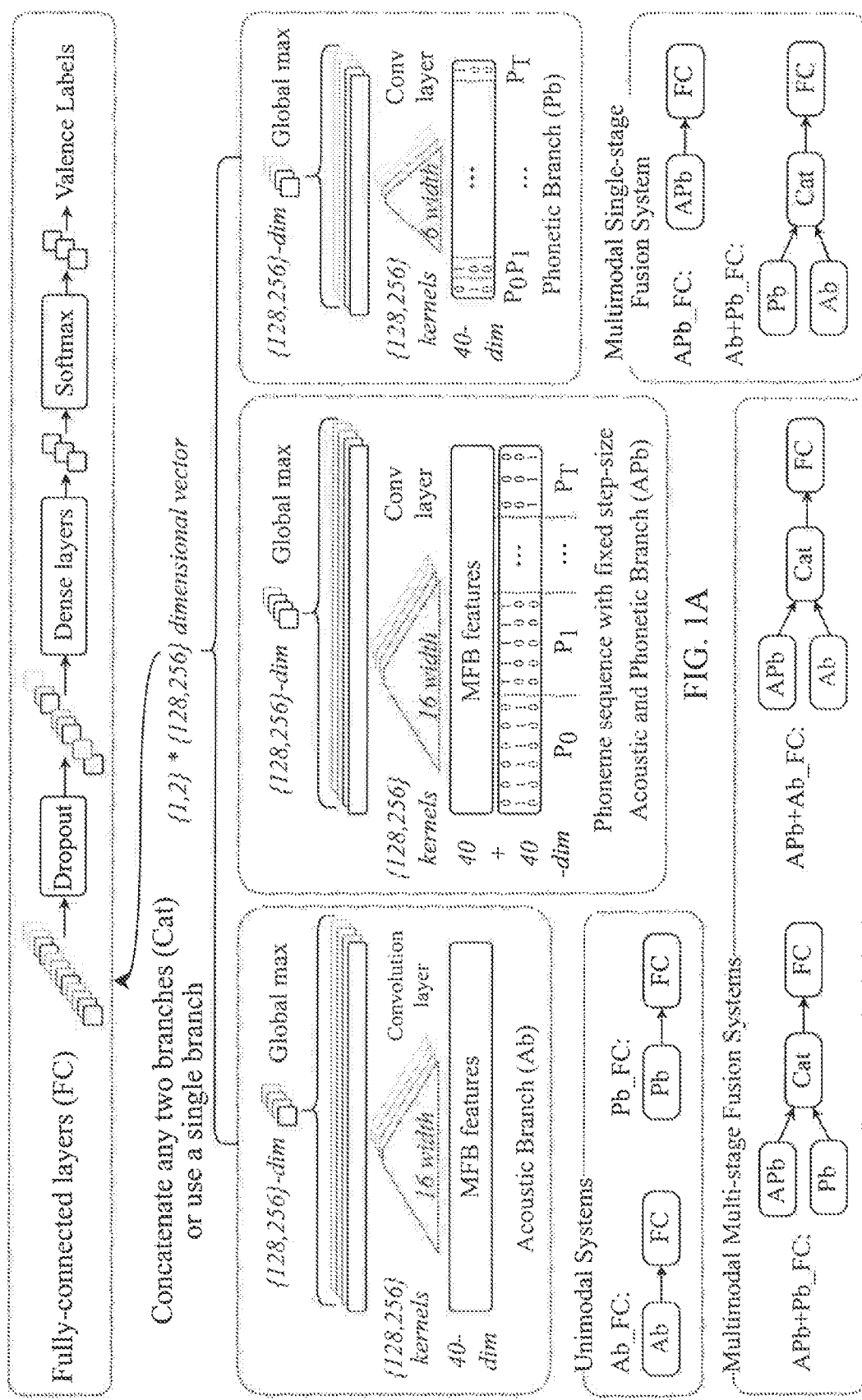

Elements of this disclosure could provide new consumer protections by identifying periods of frustration (aggressive driving) or emotion (road rage or other emotional scenarios) by detecting a negative emotional valence associated with speech utterances from drivers. An utterance is a continuous period of speech without a pause that can be associated with a valence, which identifies how negative, neutral, or positive in emotion the utterance is. In response to detecting negative valence(s), a driving control system may lower its intervention threshold and take driving control away from the driver. Speech is affected by periods of enhanced frustration and emotion and thus provides a critical marker in tracking emerging risk. We propose to develop robust and generalizable emotion recognition algorithms that can be integrated with the elements of this disclosure system.

Emotions modulate speech acoustics as well as language. The latter influences the sequences of phonemes that are produced, which in turn further modulate the acoustics. Therefore, phonemes impact emotion recognition in two ways: (1) they introduce an additional source of variability in speech signals and (2) they provide information about the emotion expressed in speech content. Previous work in speech emotion recognition has considered (1) or (2), individually. In this disclosure, we investigate how we can jointly consider both factors to improve the prediction of emotional valence (positive vs. negative), and the relationship between improved prediction and the emotion elicitation process (e.g., fixed script, improvisation, natural interaction). We present a network that exploits both the acoustic and the lexical properties of phonetic information using multi-stage fusion. Our results on the Interactive Emotional Dyadic Motion Capture (IEMOCAP) and Multimodal Signal Processing Improvisation (MSP-Improv) datasets show that our approach outperforms systems that either do not consider the influence of phonetic information or that only consider a single aspect of this influence.

Emotions modulate acoustic signals both explicitly, through paralinguistic characteristics (e.g., the tone and tempo of speech), and implicitly, through the alteration of the content of speech. Therefore, speech content is a double-edged sword in emotion recognition: the variability it introduces to the acoustic signals makes it harder to distill emotion-related cues, yet the content itself is reflective of emotion. In this disclosure, we explicitly consider both roles of speech content and demonstrate that, in so doing, we are able to make more accurate predictions of emotional valence (positive vs. negative).

We present a speech emotion recognition (SER) system that considers: (1) the acoustic variability in terms of both emotion and speech content, here defined as sequences of phonemes, and (2) the direct connection between emotion and phoneme sequences. We investigate whether leveraging both (1) and (2) leads to improved performance. We concentrate on predicting valence (the positive vs. negative aspect of an emotional display (Refs. 1, 2) because it has been shown to be difficult given only acoustic signals (Ref. 3).

Previous research has investigated how phonemes modulate acoustics together with emotion by exploring phoneme-level emotion classification methods (Refs. 4-6), or designing acoustic features (Refs. 7-11) or labels that incorporate phonetic knowledge (Ref. 12). The results of these studies showed that phonemes vary in how they are modulated by emotion and that features designed based on phonetic knowledge work well in emotion recognition. Recent works have shown that emotion can be predicted directly from sequences of phonemes without acoustic information, by modeling phoneme sequences like word sequences (Ref. 13), using Long Term Short Memory (LSTM) networks (Ref. 14), or multi-channel Convolutional Neural Network (CNN) networks (Ref. 15). These works have also shown that combining utterance-level phonetic and acoustic representations brings further improvement. However, work that considers both the phonetic modulation of acoustics and the link between phoneme sequences and emotions is still missing. In addition, we do not yet know how models that exploit the acoustic and/or phonetic contributions of phonemes is influenced by emotion elicitation method (i.e., fixed, improvised under targeted scene, spontaneous).

In this disclosure, we seek to improve valence prediction by leveraging the dual-functionality of phonemes, using temporal Convolutional Neural Networks. We hypothesize that adding phonetic information at different stages has different effects, and that we can exploit both the acoustic and the lexical properties using a multi-stage fusion model that combines acoustic and phonetic information at both feature-level (feature fusion, FF) and utterance-level (intermediate fusion, IF). We investigate how models leveraging phonetic information at different stages are influenced by the emotion elicitation process of the data. We test our hypothesis on the IEMOCAP dataset (Ref. 16) and the MSP-Improv dataset (Ref. 17). Our results show that our multi-stage fusion model outperforms both FF and IF models, especially on data produced using improvisations and natural interactions. We also find that both FF and IF are beneficial compared to unimodal models, and that IF outperforms FF. However, the advantage of modeling phoneme sequences independently, either in unimodal phonetic model or in IF, decreases as the lexical content becomes more spontaneous indicating that this advantage may come from memorizing emotionally salient patterns in speech content. This disclosure includes the presentation of: (1) a multi-stage fusion method that exploits the dual-functionality of phonemes and (2) an investigation into the influence of the type of lexical content on the performance of the models leveraging different functions of phonemes.

Data

Datasets

We use two English dyadic emotion datasets: IEMOCAP and MSP-Improv. We choose these datasets because: (1) their sizes allow us to train neural networks; (2) they provide evaluations of valence; (3) they contain varying lexical patterns due to the use of different emotion elicitation methods, allowing us to conduct relevant analyses.

IEMOCAP

The IEMOCAP dataset consist of five sessions of dyadic interactions, each between a male and a female actor. The 12 hours of data were segmented into 10,039 utterances according to speaker turns. The emotions of the speakers were elicited through scripted and improvised scenes. The lexical content of scripted scenes and the improvisation targets of the improvised scenes are shared across sessions. The scripted and improvised portions of IEMOCAP consist of 5,255 and 4,784 utterances, respectively. The valence of each utterance is assessed by at least two evaluators using a 5-point scale. We create phone-level transcriptions by force aligning the provided manual transcriptions to the audio files (see the Data Preprocessing section). We exclude six utterances for which forced alignment failed. We conduct experiments: over the entire dataset (IEMOCAP-all), on only the scripted utterances (IEMOCAP-scripted), and on only the improvised utterances (IEMOCAP-improv).

MSP-Improv

The MSP-Improv corpus contains six sessions of dyadic interactions between pairs of male-female actors. There are nine hours of speech and 8,438 utterances. The data elicitation included both improvisations and target sentences embedded in designed scenarios. The valence of each utterance is assessed using a 5-point scale by at least five evaluators. We use the automatic transcriptions produced by the Bing Speech API (which can be found at https://azure.microsoft.com/en-us/services/cognitive-services/speech/), provided by the creator of the dataset. We focus on the improvisations and the natural interactions and only use utterances that have transcriptions in our experiments. This decreased our data to 5,650 utterances, which we refer to as MSP-I+N. We choose to exclude target sentences and not to perform experiments for the improvised and natural partitions separately due to the limited size of the partition.

Data Preprocessing

Labels

We convert the 5-point ratings into three categories: negative, neutral, and positive, and generate fuzzy labels for each utterance as in Refs. 18, 19. We represent each evaluation as a 3-dimensional one-hot vector by keeping 3 as "neutral" and merging 1-2, and 4-5 as "negative" and "positive", respectively. We then use the mean over the evaluations for each utterance as the ground truth. For instance, given an utterance with three evaluations, 3, 4, and 5, we first convert the evaluations to [0, 1, 0], [0, 0, 1], and [0, 0, 1], respectively. After taking the mean, the ground truth label for this utterance is [0, ⅓, ⅔]. In this way, we form the problem of valence recognition as a three-way classification task.

Acoustic Features

We extract 40-dimensional log Mel-frequency Filterbank energy (MFB) using Kaldi (Ref. 20). The MFBs are computed over frames of 25 ms, with a step size of 10 ms, as in Refs. 19, 21, 22. We perform speaker-dependent z-normalization at the frame-level.

Phonemes

We acquire the start and end time of each phoneme by using forced alignment between the audio and the manual (IEMOCAP) or automatic (MSP-Improv) transcriptions. We use Gentle (which can be found at https://lowerquality.com/gentle/), a Kaldi-based forced aligner. It identifies 39 unique phonemes and an additional "out of vocabulary" label for unrecognized sounds, resulting in a 40-dimensional one-hot vector for each phoneme. The phonetic representations are used in two different ways: (1) independently without repetition, and (2) repeated and with the same step-size as acoustic features. See more details in the Network Structures section below.

Methodology

Network Structures

We design our models based on the temporal Convolutional Neural Network with global pooling (Conv-Pool) structure, which has been demonstrated to perform well in Ref. 21, 22. FIG. 1A shows a general network that illustrates all of the components, including: the acoustic branch (Ab), the phonetic branch (Pb), the acoustic and phonetic branch (APb) that combines features of the two modalities; the concatenation of the utterance level representations (Cat), and a stack of dropout, fully-connected and softmax layers (FC). FIG. 1B shows architectures for all of the models. These networks consist of the following components in FIG. 1A:

A Conv-Pool sub-network (i.e., a 1-dimensional convolutional layer over time and a global max-pooling layer) that generates a fixed-length utterance-level representation from variable-length input of acoustic and/or phonetic features.

A concatenation of the multiple utterance-level representations (denoted as "Cat" in FIG. 1 and "+" in model names).

A fully-connected subnetwork with an optional dropout layer, two fully-connected layers and a softmax layer (denoted as (FC)). In some embodiments, the fully-connected subnetwork may only include the two fully-connected layers and the softmax layer.

There are three Conv-Pool branches in our networks: the acoustic branch (Ab), the phonetic branch (Pb), and the feature-fusion branch (APb). Ab and Pb operate on variable-length MFB features and phoneme sequences, respectively. In APb, we aim to capture the phonetic modulations of acoustic features. We concatenate the phoneme label with the MFBs at each frame. For example, if a specific phoneme lasts 0.1 seconds, the same one-hot vector is concatenated with the MFB features of the ten corresponding frames. For audio frames with no matching phoneme, a zero-vector is used instead. The number of input channels of the convolutional layer is 40, 40, and 80 for Ab, Pb, and APb, respectively. Feeding the output of a single branch to the FC sub-network results in three models shown in FIG. 1B: two unimodal models (i.e., Ab_FC and Pb_FC), and a multimodal single-stage feature-fusion model (APb_FC).

We concatenate the outputs of Ab and Pb for joint modeling in FC to capture the high-level interaction between the learned acoustic and phonetic representations. This results in our multimodal single-stage intermediate-fusion model, Ab+Pb_FC shown in FIG. 1B.

We hypothesize feature fusion and intermediate fusion play different roles in the network. Feature fusion allows our network to capture how phonemes modulate acoustics. However, it may not be effective in linking speech content and emotional state, specifically, in extracting phoneme sequences that are informative identifiers of valence. This is because: (1) each single phoneme may be repeated several times in order to have the same step-size with the MFBs, resulting in insufficient temporal context for the phoneme sequences in the convolution layer; (2) the input phoneme sequences are much more sparse than the MFBs, resulting in representations dominated by acoustic information. On the other hand, intermediate fusion can more efficiently leverage the complementary emotionally salient information learned from audio and phoneme sequences. Because of the dual-functionality of phonemes, we propose to combine them into a multi-stage fusion model to exploit the advantages of both techniques. This network, APb+Pb_FC, concatenates the representation from APb and Pb and jointly model them in FC. In addition, we explore another multi-stage fusion network, APb+Ab_FC, which concatenates APb and Ab for comparison. Both APb+Pb_FC and APb+Ab_FC are shown in FIG. 1B.

Hyper-parameters and Training Strategy

We use Rectified Linear Unit (ReLU) as the activation function in all layers but the output layer, where softmax is used. We select the layer size of the convolutional and fully-connected layers from {128, 256} as in Ref. 22. The layer size is kept consistent throughout each model. We fix the kernel width to 16 for Ab and APb, which is shown to perform well on both IEMOCAP and MSP-Improv in Ref. 21. For Pb, we select a kernel width of 6, based on the average number of phonemes (6.38) per English word, according to the Carnegie Melon University pronunciation dictionary (which can be found at http://www.speech.cs.cmu.edu/cgi-bin/cmudict). Additionally, we incorporate an optional dropout layer after the global max-pooling to improve generalization of the networks. The dropout probability is selected from {0, 0.2, 0.5}, where 0 corresponds to no dropout, and 0.2 and 0.5 are from the suggested range in Ref. 23.

We experimented using PyTorch (which can be found at https://pytorch.org/) version 0.2.0. The loss function is cross-entropy computed using the fuzzy labels. We weigh the classes using $N/(3*\Sigma_{j=1}^{N} gt_j^i)$ in the loss calculation, where N is the total number of training utterances, $gt_j^i$ is the value at position i in the fuzzy ground truth label for utterance j. We train the models using a learning rate of 0.0001 with the Adam optimizer (Ref. 24).

We use Unweighted Average Recall (UAR) as the performance measure due to unbalanced data (Ref. 25). When the ground truth has ties, we deem predictions for any of the tied positions as correct, as in Ref. 19. For instance, when the ground truth is [0.5, 0.5, 0], prediction of either 0 or 1 are correct. As a result, the chance performance of making predictions uniformly at random is higher than 33.33%.

We use the leave-one-speaker-out evaluation setting for our experiment. Both IEMOCAP and MSP-Improv are organized by sessions. At each round, we left out data from a single speaker as the test set, and use data from the other speaker in the same session for validation. The data from remaining sessions are used for training. We run each experiment five times to reduce performance fluctuation. For each training-validation-testing combination, we select the number of training epoch ($\in [1, 30]$) by maximizing the validation UAR for each run separately and select the layer size and dropout probability by maximizing the validation UAR averaged over five runs. We report the test UAR correspond to the selected hyper-parameters, averaged over speakers and runs. We set the batch size to 100, and zero-pad the features to the maximum length of each batch.

Results and Discussion

We present the UAR of all the models for the experiments on IEMOCAP-all, IEMOCAP-scripted, IEMOCAP-improv, and MSP-I+N in Table 1, together with the chance performance calculated by making predictions uniformly at random. For the results of each experiment, we first test if the influence of model is significant by using a repeated-measure ANOVA (RANOVA). We treat the per-speaker performance as the "subject" and model as the within-subject factor. We report the statistics in Table 1. We find that the influence of model is significant in all experiments when asserting significance at $p<0.05$, even with the lower bound correction. We compare pairs of models across experiments to understand the effect of each approach and the influence of the type of lexical content. We use Tukey's honest test based on the RANOVA model for these pairwise comparisons and assert significance at $p<0.05$.

TABLE 1

| Model | IEMOCAP-all | IEMOCAP-scripted | IEMOCAP-improv | MSP-I+N |
|---|---|---|---|---|
| Chance | 45.40 | 46.91 | 44.55 | 36.09 |
| Ab_FC | 64.04 | 61.18 | 65.00 | 51.84† |
| Pb_FC | 69.18* | 78.42*◊ | 62.50 | 47.54 |
| APb_FC | 67.17* | 67.21* | 67.68*† | 53.98*† |
| Ab + Pb_FC | 73.33*† ◊ | 75.09* ◊ | 69.13*† | 54.99*† |
| APb + Pb_FC | **73.79*†◊** | 75.34* ◊ | **70.05*†◊** | **55.98*†◊** |
| APb + Ab_FC | 67.09* | 65.54* | 67.44* | 54.34*† |
| F (5, 45/55) | 70.3 | 55.4 | 19.6 | 25.6 |
| $p_{LB}$ | 1.52e−5 | 3.92e−5 | 1.66e−3 | 3.67e−4 |

Table 1 shows the UAR of all the models and the statistics of RANOVA (F and $p_{LB}$) for the influence of model. The best result in each experiment is bolded. F(5,45) and F(5,45) are for experiments on IEMOCAP and MSP-I+N, respectively. $p_{LB}$ is the p-value under the lower bound correction. *, †, and ◊ represent that the marked model significantly outperforms Ab_FC, Pb_FC, and APb_FC, respectively, using Tukey's honest test and asserting significance at $p<0.05$. An analysis of the results is presented below.

Unimodal Results

We find that Pb_FC significantly outperforms Ab_FC on IEMOCAP-all and IEMOCAP-scripted, while Ab_FC significantly outperforms Pb_FC on MSP-I+N. It is clear that Pb_FC performs better than Ab_FC when all the data or a large portion of the data are scripted, while the opposite is true when there is less control on the lexical content of the data (i.e., improvisations and natural interactions). In fact, Pb_FC achieved the highest performance among all models on IEMOCAP-scripted. It is interesting to see that when emotion-related scripted data are repeated across training, validation, and testing sets, additional information from the acoustic modality brings more harm than good. This indicates that Conv-Pool with phoneme sequence can learn and memorize speech-content-related patterns that are strongly associated with emotion classes, but does not work as well as acoustics on unscripted/natural data.

Single-Stage Fusion Results

The feature-fusion model (APb_FC) significantly outperforms Ab_FC in all four experiments. However, APb_FC only significantly outperforms Pb_FC on IEMOCAP-improv and MSP-I+N, while shows significant performance loss on IEMOCAP-scripted. In addition, the performance of APb_FC is very stable across the different portions of IEMOCAP. These results support our hypothesis that in feature fusion, the phonetic information is helpful for learning emotion-salient acoustic representations, but cannot effectively capture the emotion-related patterns in speech content.

The intermediate-fusion model (Ab+Pb_FC), on the other hand, shows significant improvement compared to both Ab_FC and Pb_FC in all experiments except for Pb_FC on IEMOCAP-scripted. This indicates that there is complementary information from representations learned separately from the audio and phoneme modalities.

The advantage of Ab+Pb_FC over APb_FC decreases with the flexibility of the lexical content. Ab+Pb_FC significantly outperforms APb_FC on IEMOCAP-scripted and IEMOCAP-all, but is only comparable to APb_FC on IEMOCAP-improv and MSP-I+N. This presents additional evidence that the memorization of patterns in phoneme sequences is most beneficial when the elicitation relies upon scripts. This suggests that there are multiple causes behind the improvements over the unimodal models, via feature fusion and intermediate fusion, and that we may achieve further performance gain by combining them using multi-stage fusion.

Multi-Stage Fusion Results

Our proposed multi-stage fusion model, APb+Pb_FC, aims to exploit the dual-functionality of phonemes. It significantly outperforms APb_FC in all four experiments. APb+Pb_FC also shows consistent performance improvement over Ab+Pb_FC, and the advantage is larger on data with less control over the lexical content (i.e., IEMOCAP-improv and MSP-I+N). This result supports our hypothesis that the consideration of both the phonetic modulation of acoustics and the connection between phoneme sequences and emotions allows us to improve the performance of valence prediction.

We investigate the performance of another multi-stage fusion model, APb+Ab_FC, which merges the outputs of the feature fusion branch and the unimodal acoustic branch. We find that APb+Ab_FC is comparable to APb_FC in all experiments, and significantly outperformed by Ab+Pb_FC on IEMOCAP-all and IEMOCAP-scripted. The fact that repeatedly adding the acoustic modality does not improve performance is in line with our hypothesis that the learned representation from fused acoustic and phonetic features is dominated by the audio modality.

We compare our best UAR with the state-of-the-art result using the same label processing, training-validation-testing folds, and evaluation method (Ref. 19). We find that APb+Pb_FC outperforms the intermediate-fusion of the acoustic and lexical modalities using outer-product in (Ref. 19) by 4.4% in UAR on IEMOCAP-all. This further demonstrates the effectiveness of our method. We note, however, that we cannot attribute the performance gain completely to the use of phoneme sequences and multi-stage fusion. The differences in network structure (e.g., Conv-Pool vs. Gated Recurrent Unit (GRU), the use of dropout), hyper-parameters (e.g., layer size, kernel width), and training paradigm all have important influence on the final results.

Conclusions

In this disclosure, we explore the impact of incorporating phonetic knowledge into acoustic valence recognition. We propose to repeatedly add phonetic features, at both feature-level and utterance-level, into a single temporal convolutional neural network. We show that this multi-stage fusion model outperforms all other models on IEMOCAP-all, IEMOCAP-improv, and MSP-I+N, even when the transcriptions are estimated using Automatic Speech Recognition (ASR) systems (i.e., MSP). The gain over the most accurate network that fuses acoustic and phonetic information at a single stage is the greatest given improvised and natural interactions. This demonstrates efficacy of this approach given imperfect transcriptions and speech data that are collected without reliance upon a script. Finally, the proposed system outperforms the state-of-the-art approach from the literature.

Our results also show that the phonetic branch helps the network leverage the direct link between emotion and speech content contained in phoneme sequences. Feature fusion can capture the phonetic modulation of acoustics, but the resulting representation is dominated by the acoustic modality. The advantage of intermediate fusion over feature fusion decreases when the lexical content becomes more spontaneous. These findings support our assumption that feature fusion and intermediate fusion exploit acoustic and lexical contributions of phonemes, respectively. We envision the feasibility of performing integrated phone recognition coupled with emotion recognition.

Example 2

Figure 2:
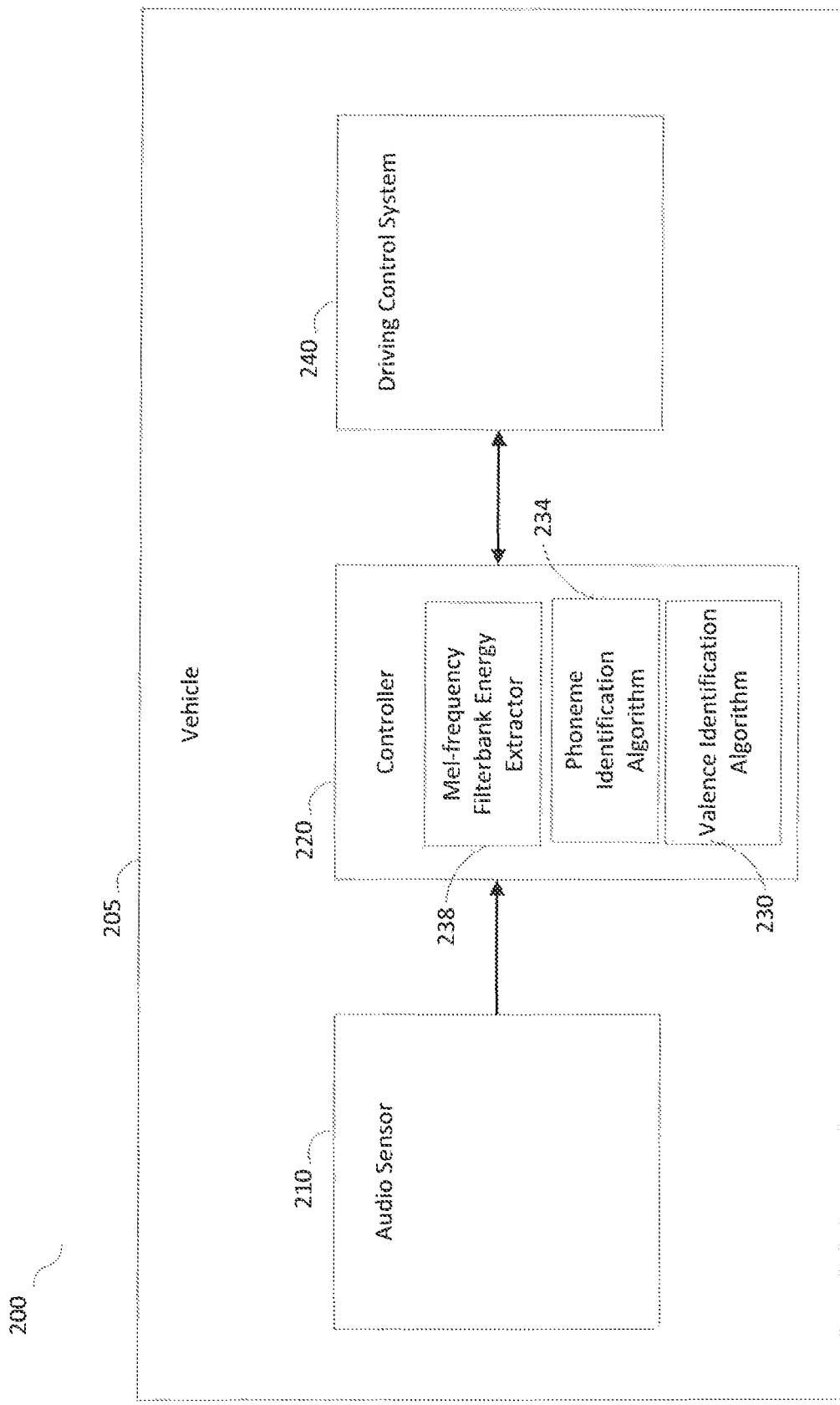
FIG. 2 shows a block diagram of an electronic control system of a vehicle.

Referring now to FIG. 2, a block diagram of an electronic control system of a vehicle 205 is shown. The vehicle 205 may be coupled to an audio sensor 210, a controller 220 programmed to execute a Mel-frequency Filterbank (MFB) energy extractor 238, a phoneme identification algorithm 234, and a valence identification algorithm 230. The vehicle 205 may also be coupled to a driving control system 240.

The audio sensor 210 can be a standalone sensor such as a microphone configured to sense an audio signal. The audio sensor 210 could be a sensor with an integrated audio sensor, such as a camera with an integrated microphone. The controller 220 can be a microcontroller with any suitable volatile memory, non-volatile memory, storage, or any suitable combination thereof. For example, the memory can include RAM, ROM, EEPROM, one or more flash drives, one or more hard disks, one or more solid state drives, one or more optical drives, etc. The memory can contain the instructions necessary to implement the Mel-frequency Filterbank (MFB) energy extractor 238, the phoneme identification algorithm 234, and the valence identification algorithm 230. In some embodiments, there can be multiple controllers each configured to implement one of the Mel-frequency Filterbank (MFB) energy extractor 238, the phoneme identification algorithm 234, or the valence identification algorithm 230. The controller 234 can have one or more processors.

The audio sensor 210 is coupled to the controller 220 in order to send a sensed audio signal to the controller 220. The audio signal can be organized as utterances. Each utterance is a sentence or a sequence of one or more words and non-verbal expressions such as laughter or crying uttered by a human, such as the driver of the vehicle 205. An utterance may be determined by the controller 220 to be separated from another utterance by a pause, or period of silence.

The controller 220 can provide the utterance of the signal to the MFB energy extractor 238 in order to extract MFB energy frames at a predetermined frame length, step size, and dimensional size. Additionally, the utterance of the signal is provided to the phoneme detection algorithm 234 in order to extract one or more phonemes of the utterance. The phoneme detection algorithm 234 can output each phoneme as a one-hot vector as described above. The phoneme detection algorithm 234 can detect the start and end time of each phoneme and associate each MFB frame with a corresponding phoneme one-hot vector. The corresponding phoneme can be determined by comparing the start and end time of the phoneme to the acoustic frame. For example, if a phoneme is present over ten consecutive MFB frames, the same one hot vector is repeated ten times and concatenated with the MFB features of the ten corresponding frames. If an MFB energy frame has multiple phonemes overlapping the start and end time of the frame, the phoneme with the greatest share if the MFB energy frame can be selected to be concatenated with the MFB energy frame. The one-hot vector can have a dimension of the number of phonemes recognizable by the phoneme detection algorithm 234 plus one, representing an unknown phoneme. It is contemplated that the phoneme detection algorithm 234 can be optimized to recognize any number of phonemes used by different languages, and can therefore be applied to multiple languages.

As will be explained in detail later, the valence identification algorithm 230 can receive the MFB energy frames and corresponding phonemes of an utterance in order to determine a valence of the utterance and perform a driving maneuver. The valence can then be provided to the driving control system 240. If the driving control system 240 determines enough received valences are negative, the driving control system 240 may take control of the vehicle 205 away from the driver.

The driving control system 240 may be an autonomous driving system with one or more controllers coupled to sensors and vehicle controls and configured to control the vehicle 205 based on sensed inputs from the sensors. The driving control system 240 may have control of various vehicle subsystems such as throttle or engine control, brakes, or steering. In an example maneuver, if the driving control system is a fully autonomous driving system such as Tesla Autopilot, the driving control system 240 may determine enough received valences are negative, ignore all input from the driver, and assert full control of the vehicle 205. Input from the driver may include throttle, braking, transmission, or steering inputs. It is also contemplated that in less sophisticated system, the driving control system 240 may simply alert the driver using a light or display screen to warn against reckless driving behavior.

Figure 3:
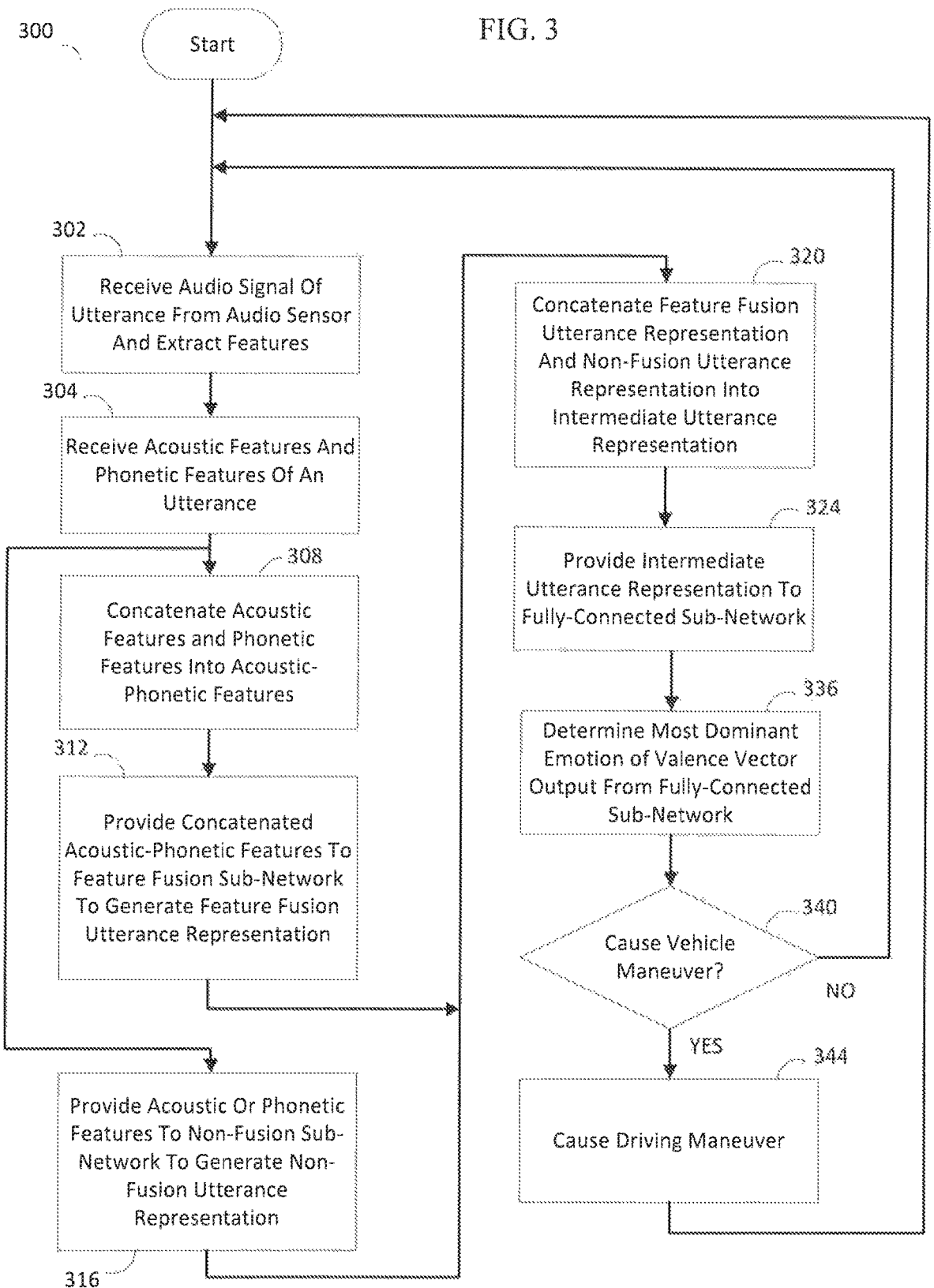
FIG. 3 shows an example of a process for extracting phonetic and acoustic features of an utterance received from an audio sensor, determining a valence of the utterance and performing a driving maneuver based on the valence in a vehicle.

Referring to FIG. 2 as well as FIG. 3, an example of a process 300 for extracting phonetic and acoustic features of an utterance received from an audio sensor, determining a valence of the utterance and performing a driving maneuver based on the valence in a vehicle is shown. The process 300 can implement a valence extractor with multi-stage fusion of phonetic and acoustic information, and a convolutional neural network that can include a feature fusion sub-network that contains a convolutional layer and a global-pooling layer, a non-fusion sub-network that contains a convolutional layer and a global-pooling layer, and a fully-connected sub-network that contains one or more fully-connected layers and a softmax layer. The convolutional neural network can be trained on training data. In some embodiments, the convolutional neural network can be trained using a learning rate of 0.0001 with the Adam optimizer as described above. The process 300 takes in acoustic and phonetic information of an utterance and outputs a valence value indicative of a positive, neutral, or negative emotion of the utterance. The process 300 can then trigger a driving maneuver based on the valence value. The process 300 can be implemented as instructions on a memory of a computational device with at least one processor such as the controller 220.

At 302, the process 300 can receive an audio signal an utterance of a driver from an audio sensor and extract phonetic and acoustic features from the signal. The acoustic features can be extracted from the signal by a Mel-frequency Filterbank (MFB) energy extractor in the form of MFB energy frames at a predetermined frame length, step size, and dimensional size, such as 25 ms, 10 ms, and 40 respectively. The phonetic features can be extracted from the signal using a phoneme detector such as the BeBe system, CMUSphinx (available at https://cmusphinx.github.io/wiki/phonemerecognition/), a phoneme recognizer from Brno University of Technology (available at https://speech.fit.vutbr.cz/software/phoneme-recognizer-based-long-temporal-context), and represented using a one-hot vector as described above. The phoneme detector can determine one or more phonemes active over time in the audio signal. More specifically, the utterance consists of one or more phonemes with non-overlapping start and end times. The phonetic detector can be used to identify a certain number of phonemes identifiable by the phoneme detector and an "out of vocabulary" label. In some embodiments, the one-hot vector can be 40-dimensional, representing 39 unique phonemes and an additional "out of vocabulary" label for unrecognized sounds. For example, a dimensional size of 40 indicates 39 phonemes can be extracted, with an additional "unknown" phoneme for unidentifiable phonemes. The dimensional size is representative of the number of phonemes able to be extracted. The process 300 can then proceed to 304.

At 304, the process 300 can receive the acoustic and the phonetic features of an utterance. The process 300 can then proceed to 308 and 316 to perform 308 and 312 in parallel with 316. In some embodiments, 316 may be performed before or after 308 and 312, as 316 does not rely on 308 or 312 to be executed.

At 308, the process 300 can concatenate the received acoustic features and phonetic features into acoustic-phonetic features. In some embodiments, the acoustic features and phonetic features can be combined using interweaving or another method that will combine the acoustic features and the phonetic features into a single vector. The convolutional neural network can then be trained in the same manner as if the acoustic features and phonetic features were concatenated. Each frame of the acoustic features is aligned with a corresponding phoneme one-hot vector. The corresponding phoneme can be determined by comparing the start and end time of the phoneme to the acoustic frame. If an MFB energy frame has multiple phonemes overlapping the start and end time of the frame, the phoneme with the greatest share if the MFB energy frame can be selected to be concatenated with the MFB energy frame. The acoustic-phonetic features can have a vector of values of length eighty at each time point. The process 300 can then proceed to 312.

At 312, the process 300 can provide the acoustic-phonetic features to the feature fusion sub-network. The feature fusion sub-network can include a convolutional layer and a global pooling layer as described above. In some embodiments, the convolutional layer can be a 1-dimensional layer in which the convolution operation is performed along the time dimension of the acoustic and phonetic features, treating each dimension of the acoustic-phonetic features as a input channel. Some embodiments may have a layer size selected from {128, 256} and a kernel width of at least sixteen. Some embodiments may have different layer and/or kernel sizes that may provide better valence prediction. An output value or activation of each kernel in the layer is recorded as the filter is swept over the acoustic features, and is input into an activation function which computes an output value. The activation function can be a rectified linear unit (ReLU) function. The global max-pooling layer then outputs the maximum output value of each kernel into a feature fusion utterance representation with the same length as the layer size. It is contemplated that the feature fusion sub-network could include different layers capable of outputting a fixed length representation based on variable length inputs in place of the convolutional and global pooling layers. The process 300 can then proceed to 320.

At 316, the process 300 can provide either acoustic or phonetic features to the non-fusion sub-network. As mentioned above, the acoustic features can be MFB energy frames with a predetermined frame length, step size, and dimensional size. The phonetic features can be one or more one-hot vectors representing phonemes. Each phoneme is represented by a single one-hot vector regardless of the time duration of the phoneme. The non-fusion sub-network can include a convolutional layer and a global pooling layer as described above. In some embodiments, the convolutional layer can be a 1-dimensional layer in which the convolution operation is performed along the time dimension of the acoustic or phonetic features, treating each dimension of the acoustic or phonetic features as an input channel. Some embodiments may have a layer size selected from {128, 256} and a kernel width of at least sixteen. Some embodiments may have different layer and/or kernel sizes that may provide better valence prediction. An output value or activation of each kernel in the layer is recorded as the filter is swept over the acoustic features, and is input into an activation function which computes an output value. The activation function can be a rectified linear unit (ReLU) function. The global max-pooling layer then outputs the maximum output value of each kernel into a non-fusion utterance representation with the same length as the layer size. It is contemplated that the non-fusion sub-network could include different layers capable of outputting a fixed length representation based on variable length inputs in place of the convolutional and global pooling layers. The process 300 can then proceed to 320.

At 320, the process 300 can concatenate the feature fusion utterance representation and the non-fusion utterance representation into an intermediate utterance representation. In some embodiments, the feature fusion utterance representation and the non-fusion utterance representation can be combined using interweaving or another method that will combine the feature fusion utterance representation and the non-fusion utterance representation into a single vector. The intermediate utterance representation can be a vector with the output of the acoustic-phonetic plus phonetic branch (APb+Pb) or the acoustic-phonetic plus acoustic branch (APb+Ab), labeled as Cat in FIG. 1B. In some embodiments, the second stage branch can be a vector of length {256, 512} based on what layer size the feature fusion and non-fusion branches were selected to have. The process 300 can then proceed to 324.

At 324, the process 300 can provide the intermediate utterance representation to the fully-connected sub-network. The fully-connected sub-network can include a dropout layer, one or more fully-connected layers, and a softmax layer. The dropout layer is optional and may improve the generalization of the convolutional neural network In some embodiments, the dropout probability of each activation in the feature fusion and non-fusion branches can be selected from {0, 0.2, 0.5}, where 0 corresponds to no dropout. In the case that there is a dropout layer, the intermediate utterance can be provided to the dropout layer, and the output of the dropout layer can then be provided to a first fully-connected layer. Alternatively, the intermediate utterance can be provided to the first fully-connected layer. Each fully-connected layer can be the same size as the layers of the feature fusion sub-network or the non-fusion sub-network. A final fully-connected layer outputs a fully-connected output vector the same size as one of the fully-connected layers. The process 300 can then provide the fully-connected output vector to a softmax layer. In some embodiments, there may be a single fully-connected layer that receives the output of the dropout layer or the intermediate utterance and provides the fully-connected output vector to the softmax layer. The softmax layer takes in the fully-connected output vector and outputs a valence vector that can include three values indicating a prediction of negative, neutral, and positive valence of the utterance. The three values in the valence vector sum to one. In some embodiments, the softmax layer may output a valence vector with more than three values in order to indicate various degrees of positive and/or negative valence of the utterance. The process then proceed to 336.

At 336, the process 300 can determine the most dominant emotion in the valence vector. For example, if the valence vector is ordered negative, neutral, and positive values and the values are 0.6, 0.25, and 0.15, the process 300 would determine the valence of the utterance is negative. The process 400 can then proceed to 340.

At 340, the process 300 can decide whether or not to cause a driving maneuver based on a recent history of the emotion determined by the process in step 336. For example, the process may have a takeover threshold that if met or exceeded in the recent driving history, will trigger a driving control system such as driving control system 240 in order to perform a driving maneuver. The history could be any length of at least one. In other words, the process 300 could decide to take over after a single negative valence. For example, if the takeover threshold is six, and six of the most recent ten valences received are negative, the process 300 will trigger the driving control system to perform a driving maneuver. If the process 300 decides to trigger a driving maneuver ("YES" at 340), the process 300 can proceed to 344. If the process 300 decides not to trigger a driving maneuver ("NO" at 340), the process 300 can then proceed to 304.

At 344, the process 300 can trigger the driving control system to perform a driving maneuver. The maneuver may include ignoring all input from the driver and piloting the car autonomously, limiting the car to a maximum speed, or any other maneuver that controls some aspect of driver input. The process 300 can then proceed to 304. It is also contemplated the process 300 could simply end after 344.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIG. 3 can be executed or performed in any order or sequence not limited to the order and sequence shown and described in the figures. Also, some of the above steps of the processes of FIG. 3 can be executed or performed substantially simultaneously where appropriate or in parallel to reduce latency and processing times.

Thus, the invention provides an improved method of estimating an emotion or valence of human speech.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

[1] J A Russel, "A circumplex model of affect," Journal of Personality and Social Psychology, vol. 39, pp. 1161-78, 1980.
[2] James A Russell, "Core affect and the psychological construction of emotion," Psychological review, vol. 110, no. 1, pp. 145, 2003.
[3] Martin Wöllmer, Florian Eyben, Stephan Reiter, Björn Schuller, Cate Cox, Ellen Douglas-Cowie, and Roddy Cowie, "Abandoning emotion classes-towards continuous emotion recognition with modelling of long-range dependencies," in Interspeech, 2008, pp. 597-600.
[4] Chul Min Lee, Serdar Yildirim, Murtaza Bulut, Abe Kazemzadeh, Carlos Busso, Zhigang Deng, Sungbok Lee, and Shrikanth Narayanan, "Emotion recognition based on phoneme classes," in ICASSP, 2004.
[5] Carlos Busso, Sungbok Lee, and Shrikanth S Narayanan, "Using neutral speech models for emotional speech analysis," in Interspeech, 2007.
[6] Bogdan Vlasenko, Dmytro Prylipko, Ronald Böck, and Andreas Wendemuth, "Modeling phonetic pattern variability in favor of the creation of robust emotion classifiers for real-life applications," Computer Speech & Language, vol. 28, no. 2, pp. 483-500, 2014.
[7] Kyung Hak Hyun, Eun Ho Kim, and Yoon Keun Kwak, "Emotional feature extraction based on phoneme information for speech emotion recognition," in RO-MAN, 2007, pp. 802-806.
[8] Dmitri Bitouk, Ragini Verma, and Ani Nenkova, "Class-level spectral features for emotion recognition," Speech communication, vol. 52, no. 7-8, pp. 613-625, 2010.
[9] Bogdan Vlasenko, David Philippou-Hübner, Dmytro Prylipko, Ronald Böck, Ingo Siegert, and Andreas Wendemuth, "Vowels formants analysis allows straightforward detection of high arousal emotions," in ICME, 2011, pp. 1-6.
[10] Saurav Sahay, Shachi H Kumar, Rui Xia, Jonathan Huang, and Lama Nachman, "Multimodal relational tensor network for sentiment and emotion classification," arXiv preprint arXiv:1806.02923, 2018.
[11] Zhaocheng Huang and Julien Epps, "An investigation of partition-based and phonetically-aware acoustic features for continuous emotion prediction from speech," IEEE Transactions on Affective Computing, 2018.
[12] Wenjing Han, Huabin Ruan, Xiaomin Chen, Zhixiang Wang, Haifeng Li, and Björn Schuller, "Towards temporal modelling of categorical speech emotion recognition," Interspeech, pp. 932-936, 2018.
[13] Kalani Wataraka Gamage, Vidhyasaharan Sethu, and Eliathamby Ambikairajah, "Salience based lexical features for emotion recognition," in ICASSP, 2017, pp. 5830-5834.
[14] Kalani Wataraka Gamage, Vidhyasaharan Sethu, and Eliathamby Ambikairajah, "Modeling variable length phoneme sequences a step towards linguistic information for speech emotion recognition in wider world," in ACII, 2017, pp. 518-523.
[15] Promod Yenigalla, Abhay Kumar, Suraj Tripathi, Chirag Singh, Sibsambhu Kar, and Jithendra Vepa, "Speech emotion recognition using spectrogram & phoneme embedding," Inter-speech, pp. 3688-3692, 2018.
[16] Carlos Busso, Murtaza Bulut, Chi-Chun Lee, Abe Kazemzadeh, Emily Mower, Samuel Kim, Jeannette N Chang, Sungbok Lee, and Shrikanth S Narayanan, "Iemocap: Interactive emotional dyadic motion capture database," Language resources and evaluation, vol. 42, no. 4, pp. 335, 2008.
[17] Carlos Busso, Srinivas Parthasarathy, Alec Burmania, Mo-hammed AbdelWahab, Najmeh Sadoughi, and Emily Mower Provost, "Msp-improv: An acted corpus of dyadic interactions to study emotion perception," IEEE Transactions on Affective Computing, vol. 8, no. 1, pp. 67-80, 2017.
[18] Jonathan Chang and Stefan Scherer, "Learning representations of emotional speech with deep convolutional generative adversarial networks," in ICASSP, 2017, pp. 2746-2750.
[19] Zakaria Aldeneh, Soheil Khorram, Dimitrios Dimitriadis, and Emily Mower Provost, "Pooling acoustic and lexical features for the prediction of valence," in ICMI, 2017, pp. 68-72.
[20] Daniel Povey, Arnab Ghoshal, Gilles Boulianne, Lukas Bur-get, Ondrej Glembek, Nagendra Goel, Mirko Hannemann, Petr Motlicek, Yanmin Qian, Petr Schwarz, Jan Silovsky, Georg Stemmer, and Karel Vesely, "The kaldi speech recognition toolkit," in IEEE Workshop on Automatic Speech Recognition and Understanding, 2011.

[21] Zakaria Aldeneh and Emily Mower Provost, "Using regional saliency for speech emotion recognition," in ICASSP, 2017, pp. 2741-2745.
[22] Biqiao Zhang, Georg Essl, and Emily Mower Provost, "Predicting the distribution of emotion perception: capturing inter-rater variability," in ICMI, 2017, pp. 51-59.
[23] Nitish Srivastava, Geoffrey Hinton, Alex Krizhevsky, Ilya Sutskever, and Ruslan Salakhutdinov, "Dropout: A simple way to prevent neural networks from overfitting," The Journal of Machine Learning Research, vol. 15, no. 1, pp. 1929-1958, 2014.
[24] Diederik P Kingma and Jimmy Ba, "Adam: A method for stochastic optimization," arXiv preprint arXiv: 1412.6980, 2014.
[25] Andrew Rosenberg, "Classifying skewed data: Importance weighting to optimize average recall," in Interspeech, 2012.
[26] https://crashstats.nhtsa.dot.gov/Api/Public/ViewPublication/812115
[27] http://www.adtsea.org/Resources%20PDF%27s/AAA%202009%20Aggressive%20Driving%20Research%20Update.pdf The citation of any document is not to be construed as an admission that it is prior art with respect to the present invention.

What is claimed is:

1. A method in a data processing system comprising at least one processor and at least one memory, the at least one memory comprising instructions executed by the at least one processor to implement a valence determination system, the method comprising:
   receiving a plurality of acoustic features associated with an utterance from a driver in a vehicle with a vehicle control system;
   receiving a plurality of phonetic features associated with the utterance;
   providing the plurality of acoustic features and the plurality of phonetic features to a feature fusion sub-network trained using supervised learning;
   receiving a feature fusion utterance representation from the feature fusion sub-network;
   providing one of the plurality of acoustic features or the plurality of phonetic features to a non-fusion sub-network trained using supervised learning;
   receiving a non-fusion utterance representation from the non-fusion sub-network;
   generating an intermediate utterance representation based on the feature fusion utterance representation and the non-fusion utterance representation;
   providing at least a portion of the intermediate utterance representation to a fully-connected sub-network trained using supervised learning;
   receiving a valence vector from the fully-connected sub-network; and
   causing the vehicle control system to perform a vehicle maneuver based on the valence vector.

2. The method of claim 1 wherein the feature fusion sub-network comprises a convolutional layer and a global pooling layer.

3. The method of claim 1 wherein the fully-connected sub-network comprises a plurality of fully-connected layers and a softmax layer, wherein a first fully-connected layer is configured to output values into the softmax layer.

4. The method of claim 3, wherein the fully-connected sub-network further comprises a dropout layer configured to output values into a second fully-connected layer.

5. The method of claim 1 wherein the valence vector comprises a negative value, a neutral value, and a positive value.

6. The method of claim 1 wherein the phonetic features are one or more one-hot vectors and the acoustic features are one or more Mel-frequency Filterbank energy vectors.

7. The method of claim 6, wherein each of the Mel-frequency Filterbank energy filters has a corresponding one-hot vector.

8. The method of claim 1, wherein the non-fusion sub-network comprises a convolutional layer and a global pooling layer.

9. The method of claim 1, wherein the intermediate utterance representation is generated by concatenating the feature fusion utterance representation and the non-fusion utterance representation.

10. The method of claim 1, wherein the feature fusion sub-network, the non-fusion sub-network, and the fully-connected sub-network are trained using supervised learning with a learning rate no greater than 0.0001 and unweighted average recall as a performance measure, and the supervised learning is run at least twice using a plurality of different layer sizes and in the feature fusion sub-network, the non-fusion sub-network, and the fully-connected sub-network.

11. The method of claim 10, wherein the at least two different layer sizes include 128 and 256.

12. The method of claim 1, wherein the driving control system is associated with a fully autonomous vehicle system.

13. The method of claim 1 further comprising receiving the utterance from an audio sensor coupled to the vehicle and in communication with the processor.

14. The method of claim 13 further comprising:
   extracting the acoustic features and the phonetic features from the utterance; and
   aligning the phonetic features with the acoustic features.

15. A driving control system for a vehicle, the driving control system comprising:
   an audio sensor coupled to a vehicle; and
   a controller coupled to the vehicle and in electrical communication with the audio sensor, the controller being configured to execute a program stored in the controller to:
      (i) receive a plurality of acoustic features associated with an utterance from a driver in a vehicle with a vehicle control system;
      (ii) receive a plurality of phonetic features associated with the utterance;
      (iii) provide the plurality of acoustic features and the plurality of phonetic features to a feature fusion sub-network trained using supervised learning;
      (iv) receive a feature fusion utterance representation from the feature fusion sub-network;
      (v) provide one of the plurality of acoustic features or the plurality of phonetic features to a non-fusion sub-network trained using supervised learning;
      (vi) receive a non-fusion utterance representation from the non-fusion sub-network;
      (vii) generate an intermediate utterance representation based on the feature fusion utterance representation and the non-fusion utterance representation;
      (viii) provide at least a portion of the intermediate utterance representation to a fully-connected sub-network trained using supervised learning;

(ix) receive a valence vector from the fully-connected sub-network; and (x) cause the vehicle control system to perform a vehicle maneuver based on the valence vector.

16. The system of claim 15, wherein the feature fusion sub-network, the non-fusion sub-network, and the fully-connected sub-network are trained using supervised learning with a learning rate no greater than 0.0001 and unweighted average recall as a performance measure, and the supervised learning is run at least twice using a plurality of different layer sizes and in the feature fusion sub-network, the non-fusion sub-network, and the fully-connected sub-network.

17. The system of claim 15 wherein the phonetic features are one or more one-hot vectors and the acoustic features are one or more Mel-frequency Filterbank energy vectors.

18. The system of claim 15 wherein the fully-connected sub-network comprises a plurality of fully-connected layers and a softmax layer, wherein a first fully-connected layer is configured to output values into the softmax layer.

19. The system of claim 18, wherein the fully-connected sub-network further comprises a dropout layer configured to output values into a second fully-connected layer.

20. The system of claim 15 wherein the feature fusion sub-network comprises a convolutional layer and a global pooling layer.

* * * * *